United States Patent
Wolff-Petersen et al.

(10) Patent No.: US 9,272,221 B2
(45) Date of Patent: Mar. 1, 2016

(54) METHOD AND APPARATUS FOR CONFIGURING AN ACCESSORY DEVICE

(71) Applicant: STEELSERIES ApS, Valby (DK)

(72) Inventors: Jacob Wolff-Petersen, Richmond (GB); Kim Rom, Chicago, IL (US); Francis Arnold Grever, Palatine, IL (US); Jeffrey Nicholas Mahlmeister, Chicago, IL (US); Bruce Hawver, Hawthorn Woods, IL (US); Tino Soelberg, Copenhagen (DK); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

(21) Appl. No.: 13/787,126

(22) Filed: Mar. 6, 2013

(65) Prior Publication Data

US 2014/0256427 A1 Sep. 11, 2014

(51) Int. Cl.
*A63F 13/02* (2006.01)
*A63F 13/67* (2014.01)
*A63F 13/22* (2014.01)

(52) U.S. Cl.
CPC .................. *A63F 13/67* (2014.09); *A63F 13/22* (2014.09)

(58) Field of Classification Search
CPC ............ A63F 13/00; A63F 9/00; A63F 9/02; A63F 2300/556; A63F 2300/558; A63F 2300/5586; A63F 2300/6027
See application file for complete search history.

(56) References Cited

U.S. PATENT DOCUMENTS

| | | |
|---|---|---|
| 2003/0236878 A1 | 12/2003 | Egi |
| 2006/0030407 A1 | 2/2006 | Thayer |
| 2007/0198216 A1 | 8/2007 | Aguilar et al. |
| 2008/0266250 A1* | 10/2008 | Jacob ........................... 345/156 |
| 2008/0268943 A1* | 10/2008 | Jacob ........................... 463/23 |
| 2011/0009192 A1* | 1/2011 | Aronzon et al. ............... 463/36 |
| 2012/0264516 A1* | 10/2012 | Rudchenko et al. ............ 463/36 |
| 2012/0315983 A1* | 12/2012 | Miller et al. .................. 463/29 |

OTHER PUBLICATIONS

"ESL Pro Series", [http://www.esl.eu/benelux/pro-series/season5/, Apr. 26, 2012, 1 page.
"World of Warcraft", [http://us.battle.net/wow/en/community, Apr. 26, 2012, 1 page.

(Continued)

*Primary Examiner* — James S McClellan
*Assistant Examiner* — Kevin Carter
(74) *Attorney, Agent, or Firm* — Guntin & Gust, PLC; Douglas Schnabel

(57) ABSTRACT

The subject disclosure may include, for example, a method for determining a current performance of a gamer during a first gaming session of a gaming application, where the performance is determined from a first plurality of stimulus signals generated by a gaming accessory during the first gaming session according to a configuration setting assigned to the gaming accessory, identifying a prior performance of the gamer during a prior gaming session of the gaming application, where the prior performance is determined from a second plurality of stimulus signals generated by the gaming accessory according to the configuration setting, comparing the current performance to the prior performance to determine a change in performance of the gamer, and adjusting the configuration setting assigned to the gaming accessory according to the change in the performance of the gamer. Other embodiments are disclosed.

25 Claims, 14 Drawing Sheets

(56) References Cited

OTHER PUBLICATIONS

"ZXP 1000 Gaming Keyboard User Guide", Version 2.0, May 2007.

Blizzard Entertainment, "World of WarCraft MMO Gaming Mouse User Guide", 2008.
Otten, Martin, "Broadcasting Virtual Games in the Internet", Jun. 2001, 11 pages.

\* cited by examiner

500

700

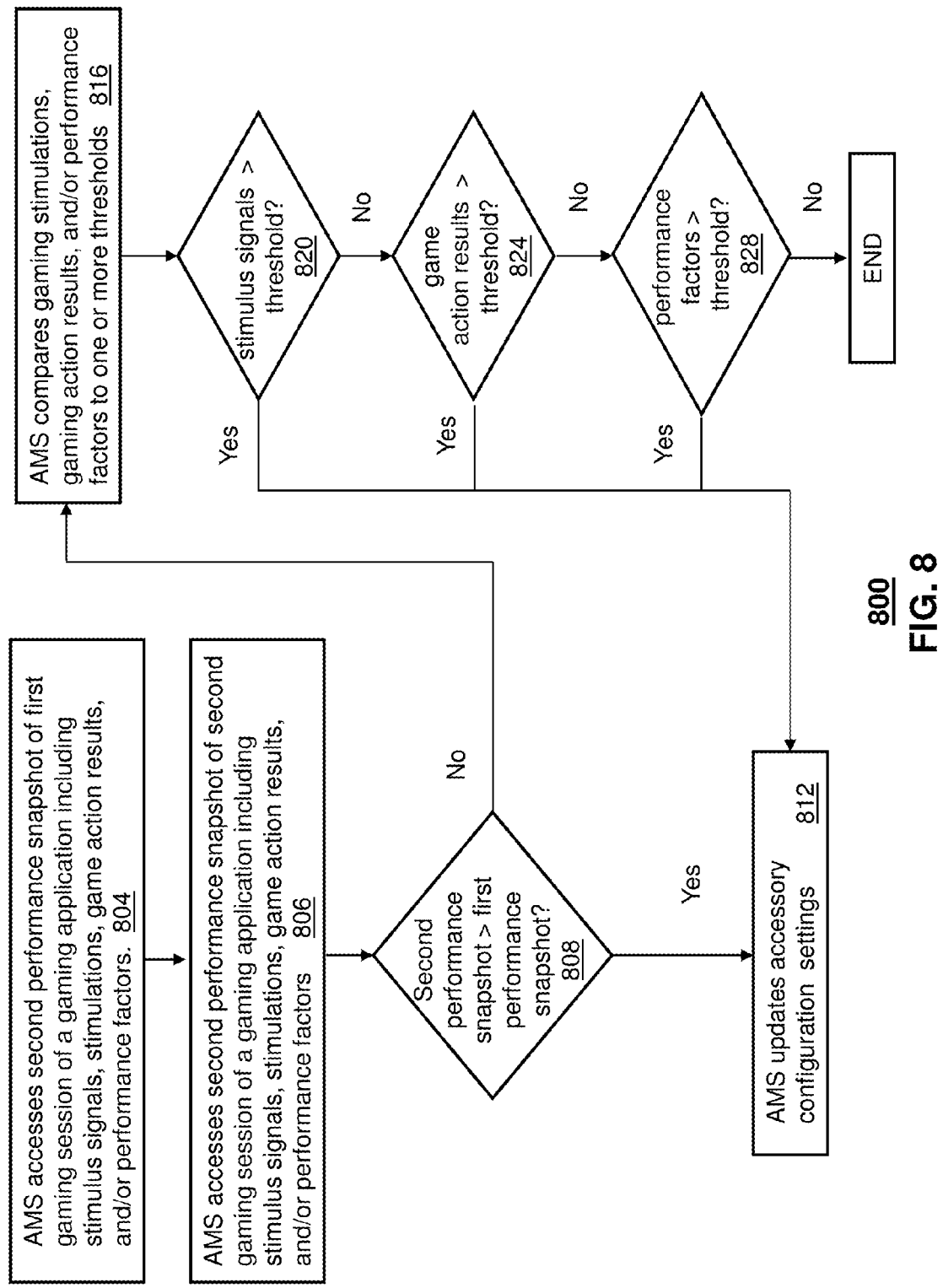

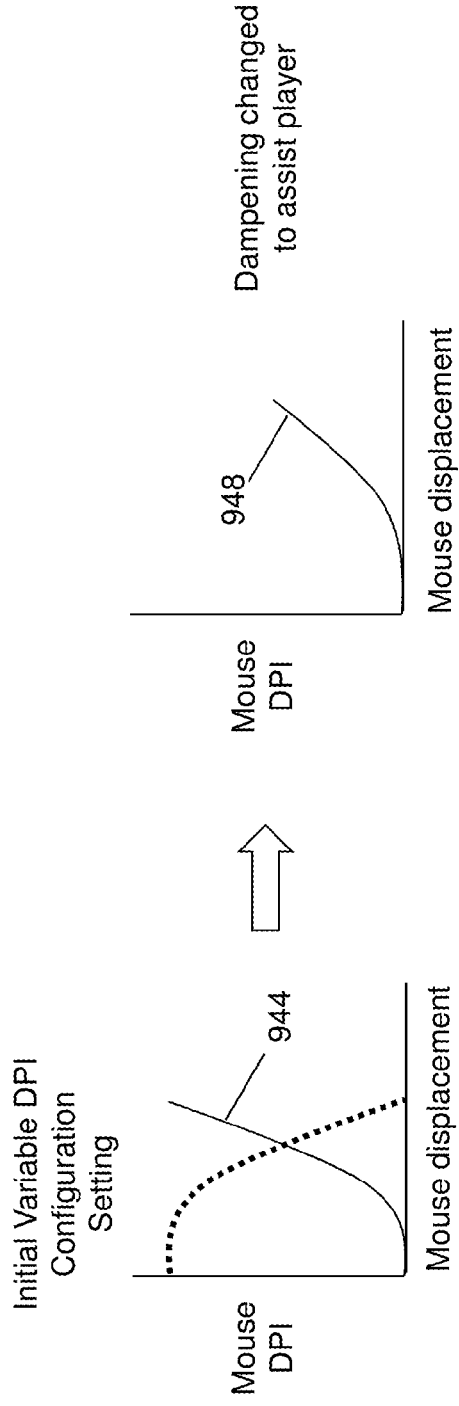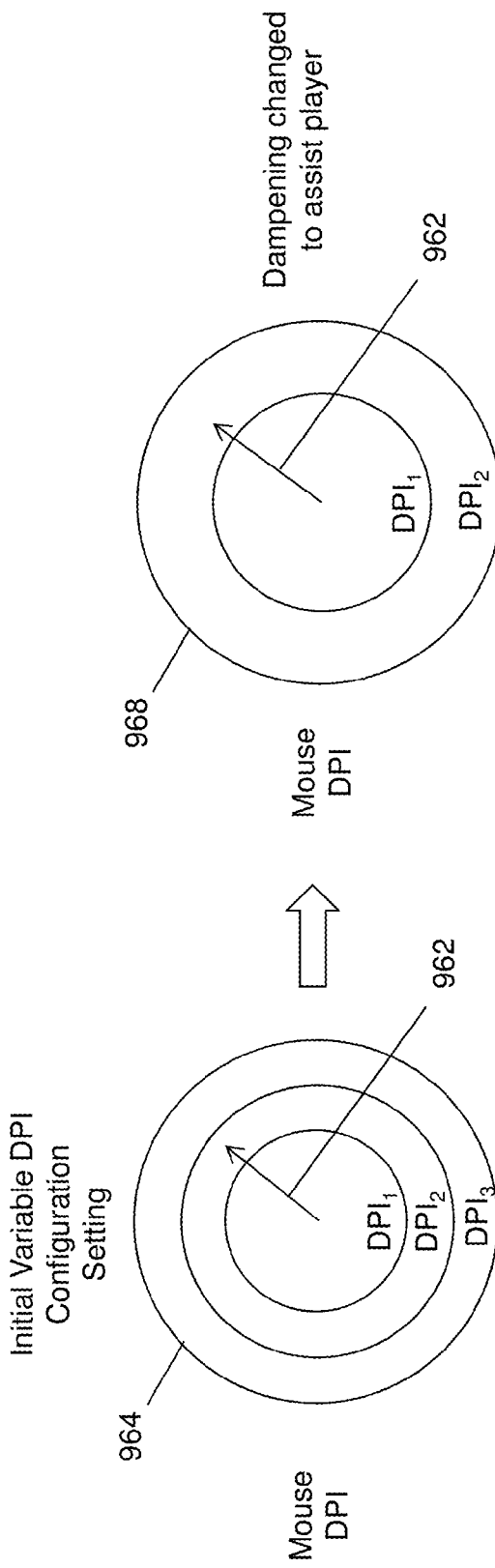

1100

Gamer Performance Factors

| Gamer | | | | | | |
|---|---|---|---|---|---|---|
| Weapon Type | Misses | Non-kill hits | Kill hits | Avg hit rate | Loss of life rate | Comp Rating |
| Sniper rifle | 3 | 7 | 4 | 29% | 5% | Trailing |
| Machine gun | 36 | 12 | 18 | 33% | 27% | Leading |
| Hand gun | 5 | 2 | 3 | 30% | 80% | Near even |

FIG. 13

Gamer Hardware Statistics

| Gamer | | | | | |
|---|---|---|---|---|---|
| Weapon Type | Subs Invoked | Macros Invoked | Shots | Rapid Shots | Single Shots |
| Sniper rifle | Up/Dwn | Team chat | 14 | 4 | 10 |
| Machine gun | Left 1 button | Toggle B/w Machine Gun Sniper Rifle | 66 | 60 | 6 |
| Hand gun | Right 1 button | Call for air support | 10 | 6 | 4 |

FIG. 12

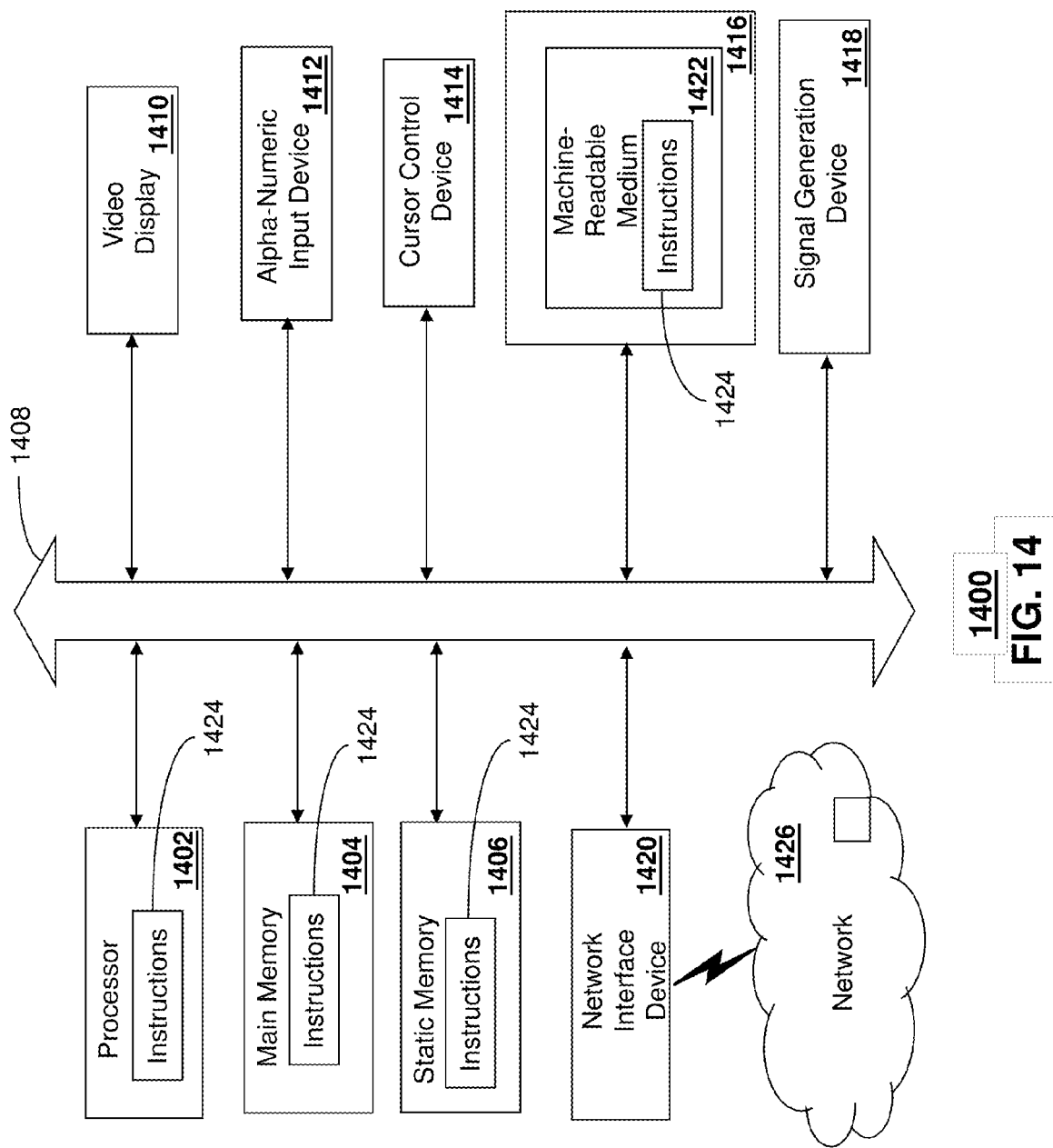

METHOD AND APPARATUS FOR CONFIGURING AN ACCESSORY DEVICE

FIELD OF THE DISCLOSURE

The present disclosure relates generally to a method and apparatus for configuring an accessory device.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete. Gamers frequently desire to improve game-playing ability and experiences.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIGS. 8 and 9A-9D depict methods describing illustrative embodiments of adaptive configuration settings controllable by the AMS application;

FIGS. 12-13 depict illustrative embodiments for gamer hardware statistics and gamer performances;

FIG. 14 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
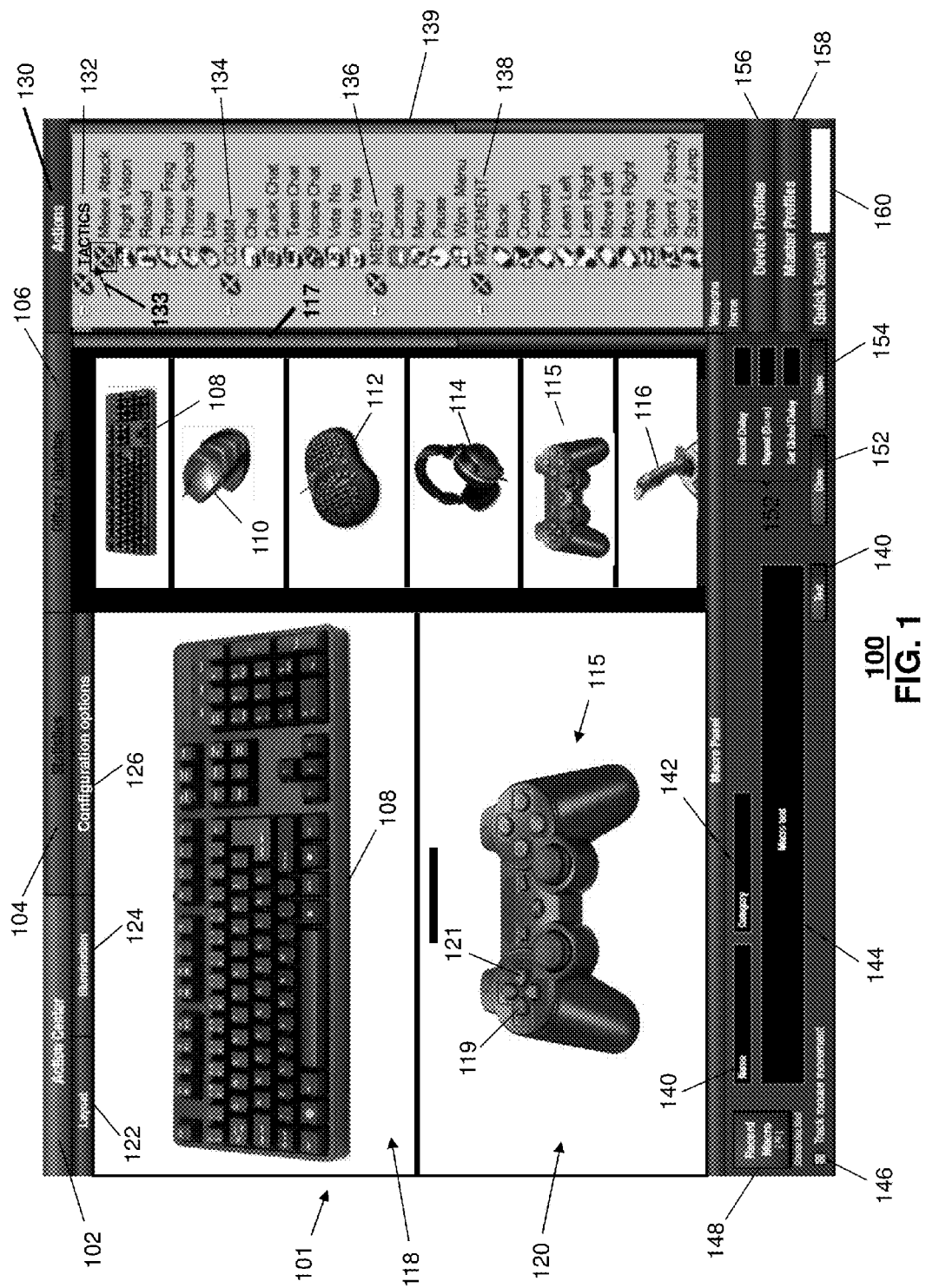
FIG. 1 depicts an illustrative embodiment of a Graphical User Interface (GUI) generated by an Accessory Management Software (AMS) application according to the present disclosure.

The subject disclosure describes, among other things, illustrative embodiments for collecting, processing, cataloguing and presenting performances of gamers and gaming accessories via a social network. Other embodiments are contemplated by the subject disclosure.

One embodiment of the present disclosure can entail a computer-readable storage medium having instructions, which when executed by a processor, cause the processor to perform operations including identifying a first performance snapshot of a first gaming session of a gaming application. The first performance snapshot can include a first plurality of stimulus signals generated by a gaming accessory during the first gaming session according to a configuration setting assigned to the gaming accessory. The processor can further perform operations for identifying a second performance snapshot of a second gaming session of the gaming application, where the second gaming session occurred prior to the first gaming session. The second performance snapshot can include a second plurality of stimulation stimulus signals generated by the gaming accessory according to the configuration setting assigned to the gaming accessory. The processor can also perform operations for comparing the first performance snapshot to the second performance snapshot to determine a change in performance of a gamer's utilization of the gaming accessory. In turn, the processor can perform operations for adjusting the configuration setting assigned to the gaming accessory according to the change in the performance of the gamer's utilization of the gaming accessory.

One embodiment of the present disclosure can entail a device having a memory for storing instructions, and a processor coupled to the memory. When executing the instructions, the processor can perform operations for including processing a plurality of stimulus signals generated by a gaming accessory according to a configuration setting associated with the gaming accessory to generate a plurality of stimulations. The processor can also perform operations for transmitting the plurality of stimulations to a gaming application. The processor can perform operations for receiving from the gaming application a plurality of game action results responsive transmitting the plurality of stimulations. The processor can further perform operations for comparing the plurality of game action results. The processor can perform operations for determining whether the plurality of game action results exceed or fall below a targeted performance threshold. The processor can, in turn, perform operations for adjusting the configuration setting according to the determination.

One embodiment of the present disclosure can entail a method for determining a current performance of a gamer during a first gaming session of a gaming application, where the performance is determined from a first plurality of stimulus signals generated by a gaming accessory during the first gaming session according to a configuration setting assigned to the gaming accessory, identifying a prior performance of the gamer during a prior gaming session of the gaming application, where the prior performance is determined from a second plurality of stimulus signals generated by the gaming accessory according to the configuration setting, comparing the current performance to the prior performance to determine a change in performance of the gamer, and adjusting the configuration setting assigned to the gaming accessory according to the change in the performance of the gamer.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). It is contemplated that the AMS application can be executed by any device with suitable computing resources.

Figure 2:
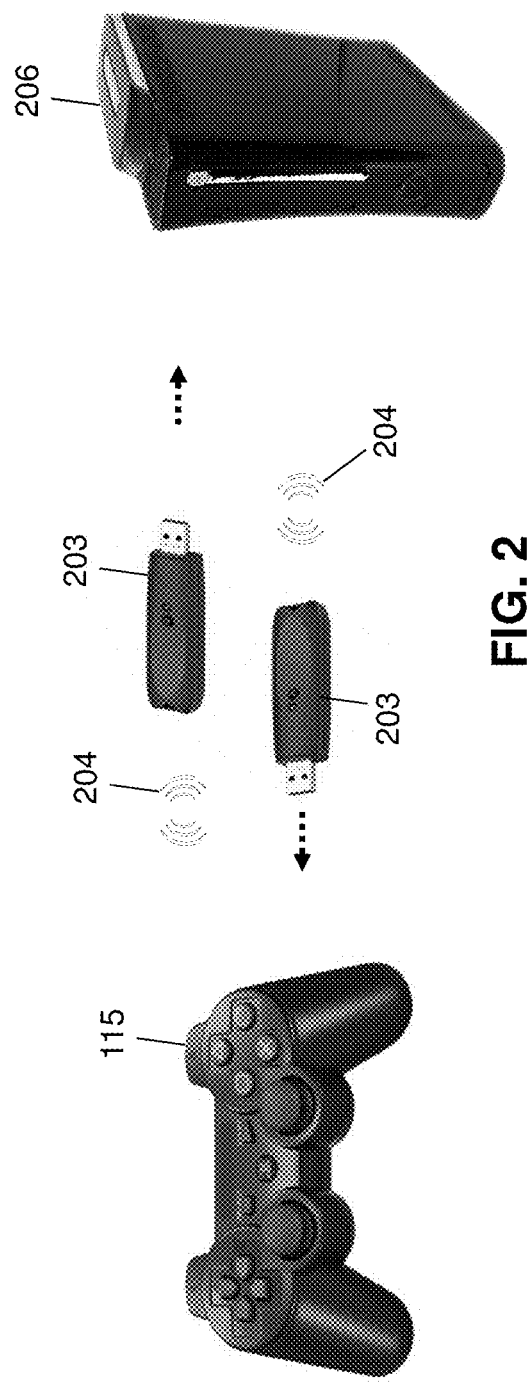
FIGS. 2-3 depict illustrative embodiments for communicatively coupling a gaming controller to a computing device.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

Figure 3:
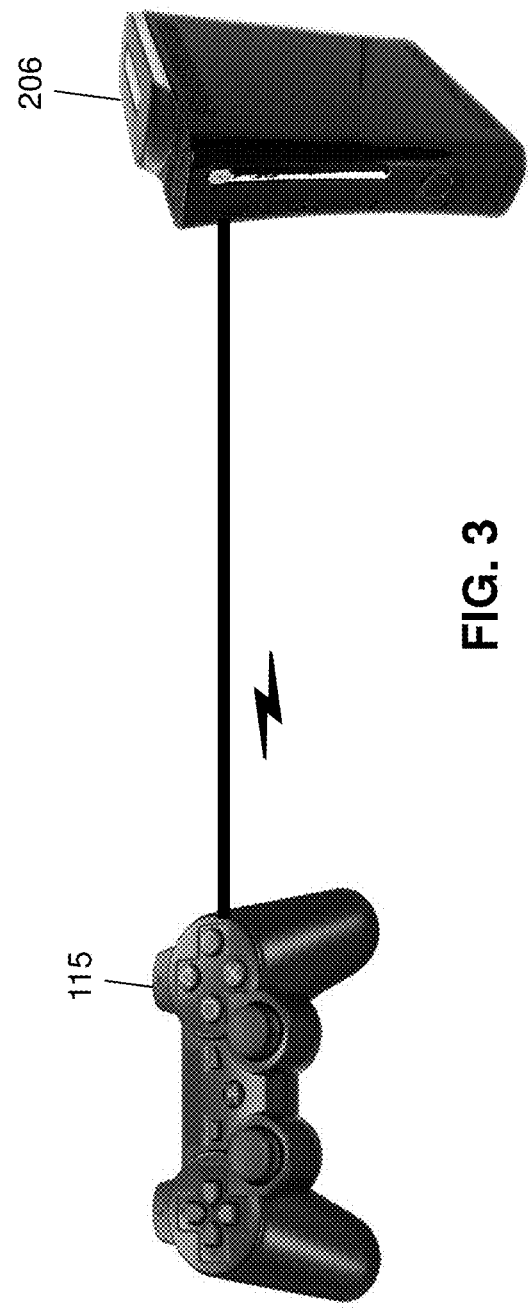

In one embodiment, the gaming controller 115 can be tethered to a computer computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications. It is contemplated that the AMS application can in whole or in part be executed by computing resources of the gaming controller 115, the gaming console 206, or combinations thereof.

Figure 4:
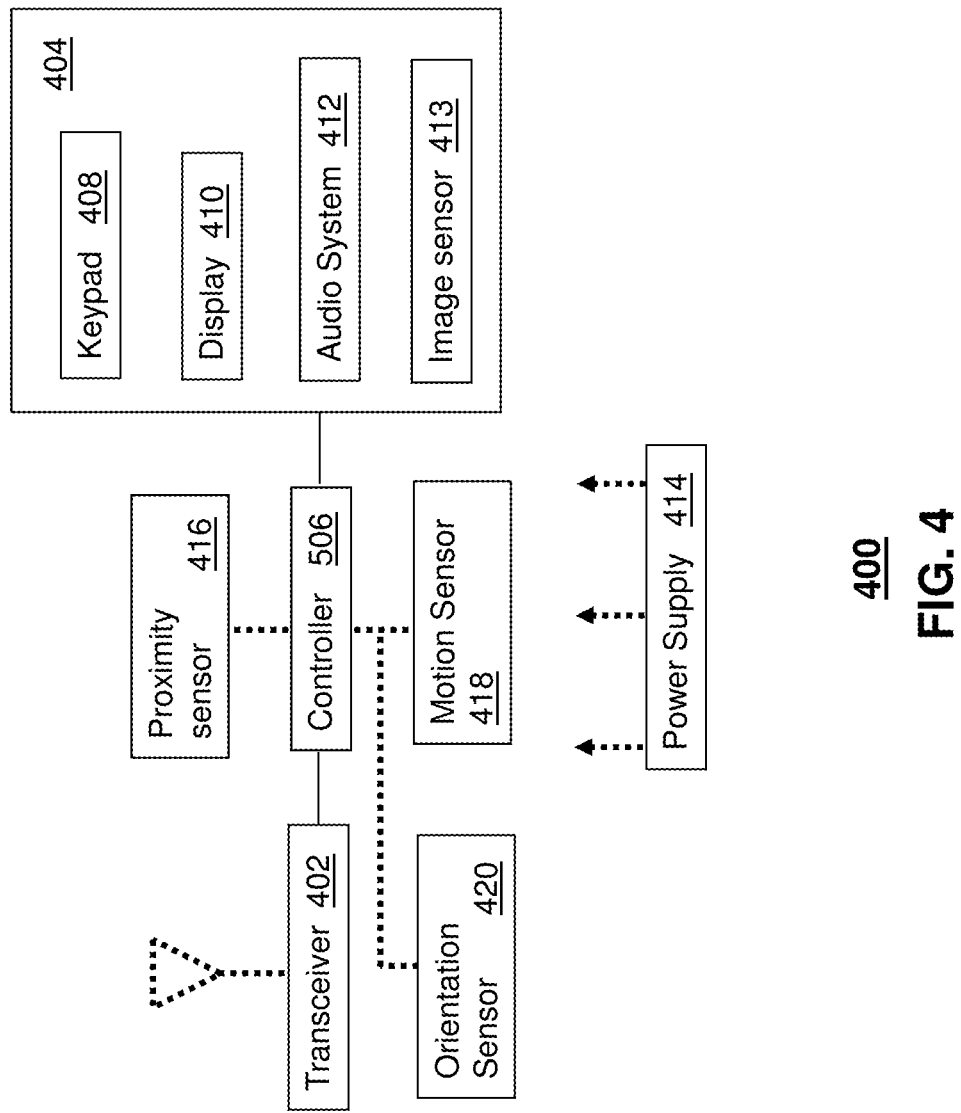
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate the implementation of the devices described by the present disclosure. These variant embodiments are contemplated by the present disclosure.

Figure 5:
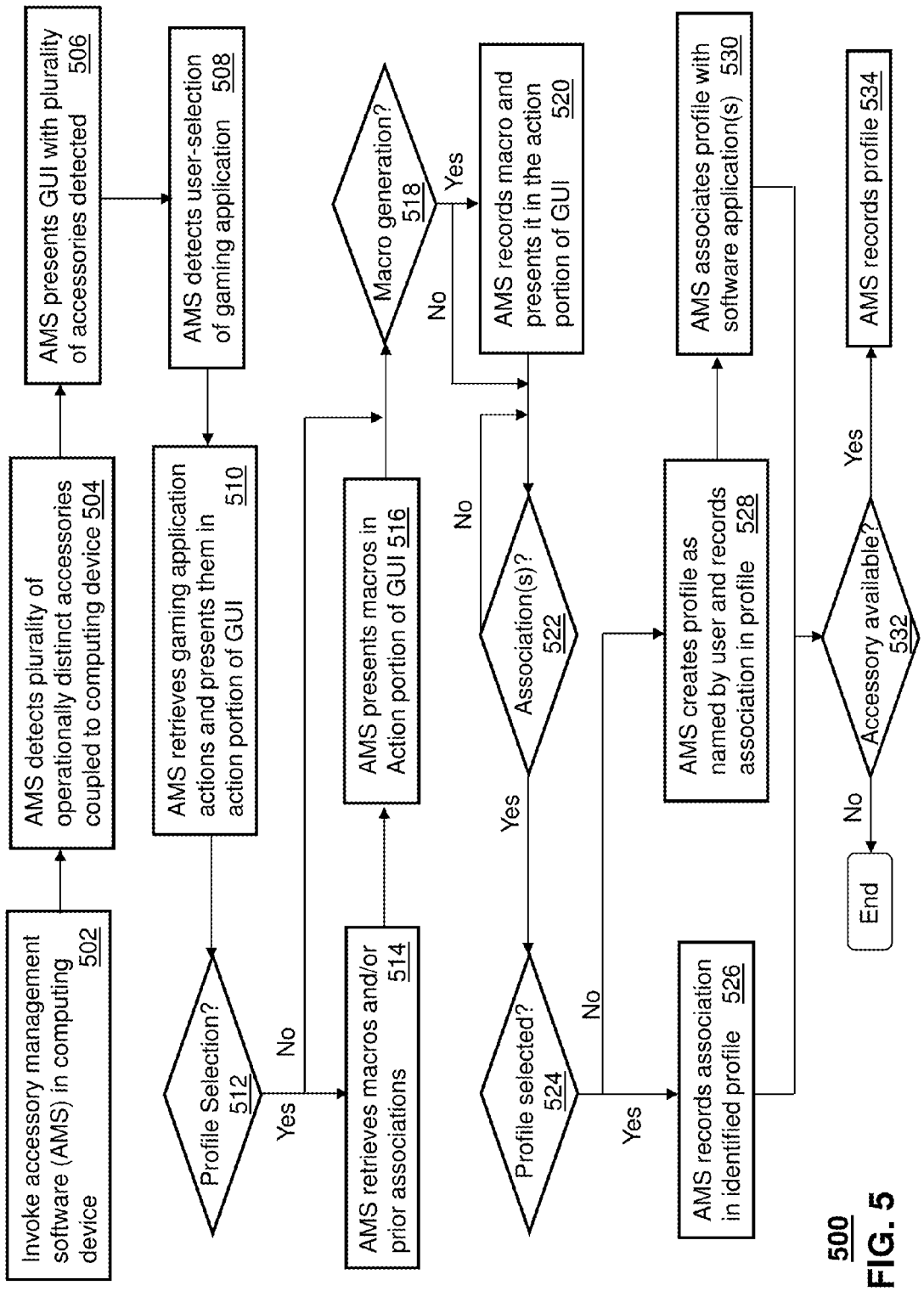
FIGS. 5-7 depict methods describing illustrative embodiments of the AMS application.
Figure 6:
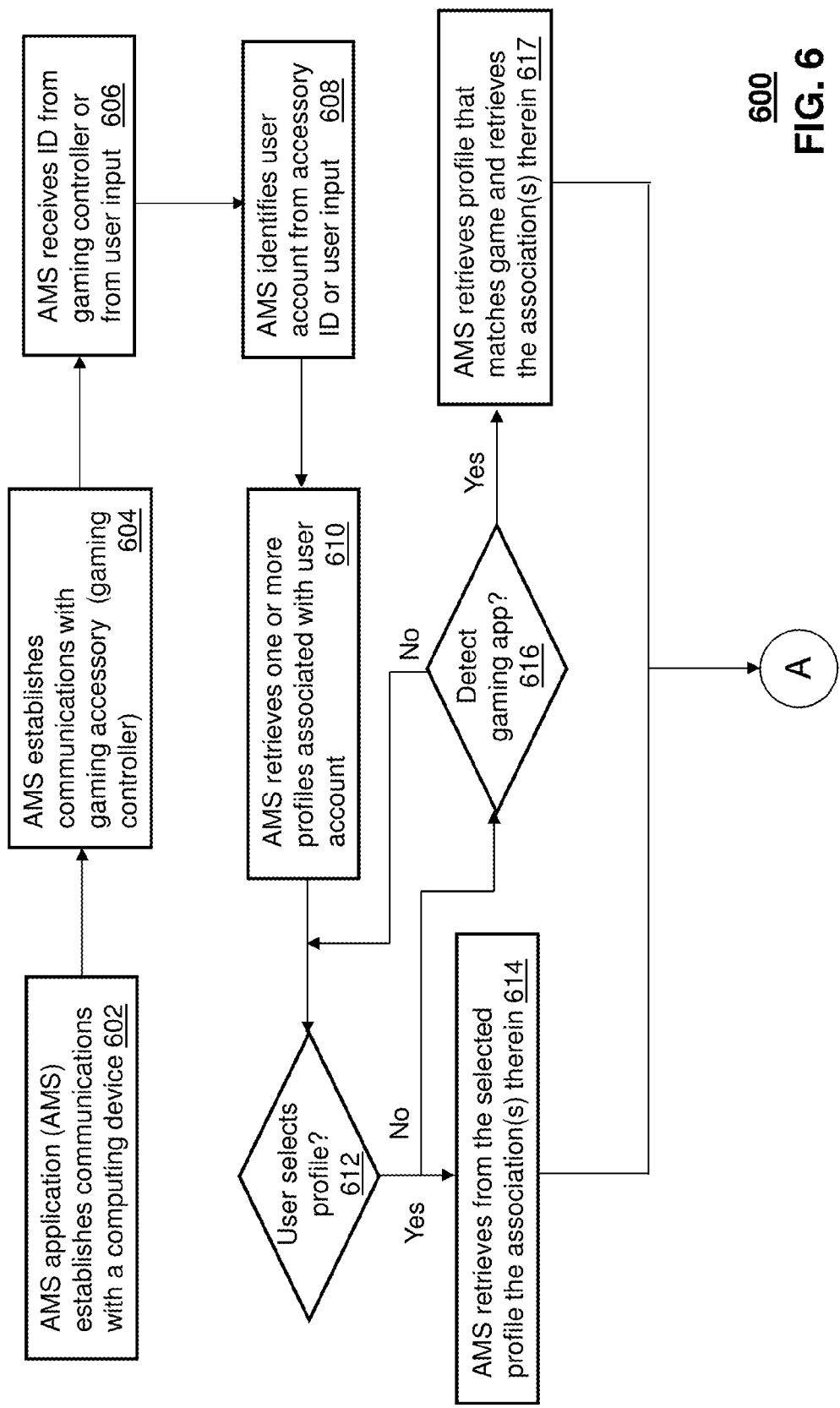
Figure 7:
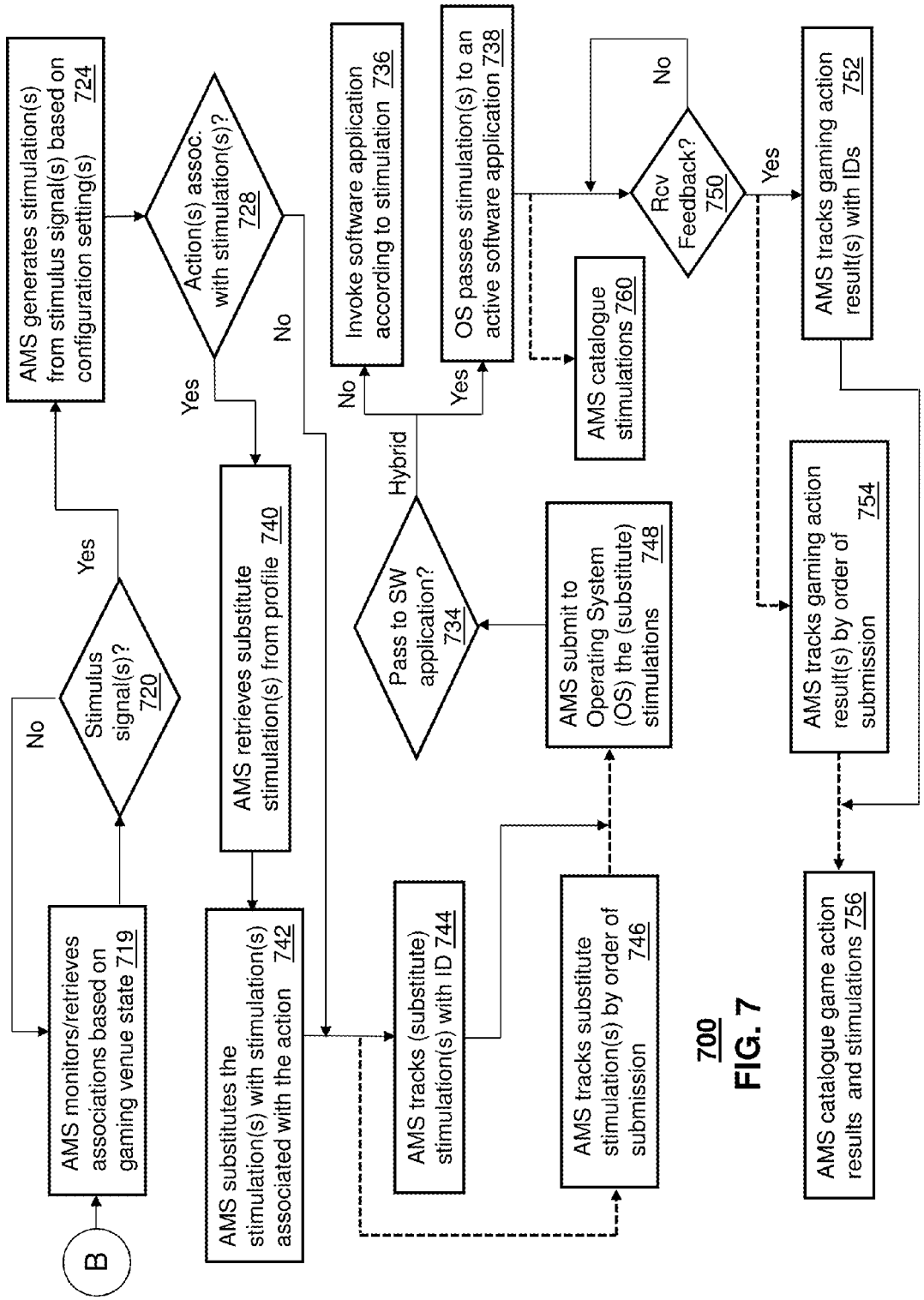

FIGS. 5-7 depict methods 500-700 describing illustrative embodiments of the AMS application. Method 500 can begin with step 502 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus signal to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded and/or stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 306) and programmable, the AMS application can proceed to step 534 of FIG. 5 where it submits the profile and its contents for storage in one of the accessories (e.g., the gaming controller 115 in FIGS. 2-3) or the dongle 203. Once the gaming controller 115, dongle 303, or combinations thereof are programmed with the profile, such devices can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the present disclosure.

FIG. 6 depicts a method 600 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulus signals, stimulations generated by AMS, navigation, and speech, invocation of other software applications, macros or other forms of suitable associations that result in substitute stimulations. The accessory stimulus signals can be generated by the gaming controller 115, other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

The AMS application can monitor in step 720 stimulus signals generated by the accessories coupled to the gaming console 206. The stimulus signals can be generated by the gamer by manipulating the gaming controller 115, and/or by generating speech commands detected by the headset 114.

If stimulus signals are detected at step 720, then the AMS application can generate stimulations from the stimulus signals based upon configuration settings in step 724. In one embodiment, the configuration settings can establish a digital responsiveness of the AMS application to changes in a stimulus signal of an accessory device. For example, a configuration setting can determine a speed of response to a movement of a mouse device. When a mouse device is moved in space, digital data is generated indicating a direction and distance of movement relative to a former position. A polling algorithm in the AMS application can read the output data of the mouse device at periodic intervals to determine if the mouse position has changed and, if so, the direction and magnitude of this change. In several embodiments, one or more configuration settings can be assigned and stored in the AMS application to control digital responsiveness, resolution, speed, feedback, and/or sensitivity of one or more accessory devices. For example, one or more configuration settings can be defined for counts per inch (CPI) for movement of an input device, frames per second (FPS) and/or dots per inch (DPI) for a display device, inches per second (IPS) for speed and acceleration of an input device, lift distance for a three-dimensional input device, polling rate, feedback intensity, scrolling and/or double-click speed, direction sensitivity and/or window pointer speed for an input device.

The configuration settings can affect playing performance when using the accessory device. For example, the counts per inch setting for a mouse device can directly affect how a mouse movement is translated into an input action at an application such as a computer game. If the CPI is set at a low resolution, movements of the input device will appear grainy or imprecise. This can be a useful setting if the game requires rapid but imprecise moves and/or is programmed to snap movements to a fixed grid pattern. However, if the game play requires precise movements, then a low CPI resolution can make it difficult or impossible to succeed at the game. For example, a game that requires precise aiming of a weapon may also require at least a minimum CPI for successful game play. As another example, a CPI that set too high can create an input with too much resolution. For example, a mouse with too much resolution for the application can be seem to be too "busy" in its movements, where even the slightest movement of twitch from the user generates a movement output. If the gaming application updates the graphical interface upon every movement of the input device, then this additional resolution can create a busy display or twitchy aiming or can even slow down game execution.

In one embodiment, the AMS application uses configuration settings to optimally convert stimulation signals from an accessory device into stimulations than can be further processed by the AMS application or sent directly to an executing game. The configuration settings can allow the player to configure the accessory device performance to fit their playing style and preferences and can be maintained in a player profile. In another embodiment, the configuration settings can be maintained in a game profile so that a player can establish and reuse configuration settings that are tailored to a particular gaming venue. In one embodiment, the configuration settings can have a default configuration that is established by the AMS application and/or by add-in applications and/or set-up data associated with each accessory device. For example, the AMS application can have default configuration settings for a mouse device. In one embodiment, the default configuration settings can be reviewed and updated using the AMS graphical user interface. In another embodiment, the default configuration settings can be overwritten by importing settings for a new or existing device. For example, a new device can include configuration setting information that can be downloaded into the AMS application.

In one embodiment, the AMS application converts each stimulus signal from each communicating accessory device into a digital stimulation signal based on the current configuration settings. For example, the AMS can have configuration settings for a mouse device that include a setting for dots per inch of 1200, and a polling rate of 500 Hertz. A stimulation signal from a communicating mouse device would be processed by the AMS application using these settings to generate a simulation signal associated with the mouse device.

In step 728, the AMS application can determine whether to forward the stimulations to an Operating System (OS) of the gaming console 206 as stimulations without substitutions. This determination can be made by comparing the stimulations to an association in the profile. If the stimulations match the associations, then the AMS application proceeds to step 740 where it retrieves substitute stimulations in the profile. In step 742, the AMS application can substitute the stimulations with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substituted stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations, the AMS application can proceed to step 748 and submit the substitute stimulations to the OS of the gaming console 206. If in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the gaming console 206 with or without tracking information as previously described.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738. For instance, suppose the stimulation sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, then the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

FIG. 8 depicts methods describing illustrative embodiments for adaptive configuration settings in the AMS application. In one embodiment, a player may have selected a gaming venue using the AMS application and a gaming accessory device. As described in FIGS. 5-7, the AMS application can receive stimulus signals from a gaming accessory device and can generate stimulations that are used by a gaming application. Game action results can be returned from the gaming application to the AMS application and then correlated to the stimulations to generate hardware statistics and performance factors for the gaming session. In one embodiment, in step 804, the AMS application can access a first performance snapshot of stimulus signals, stimulations, gaming action results, and/or performance factors associated with a first gaming session. In step 806, the AMS application can access a second performance snapshot of stimulus signals, stimulations, gaming action results, and/or performance factors associated with a second gaming session. For example, the stimulus signals, stimulations, gaming actions results, and/or performance factors can be saved by the AMS application to memory for later access. In one embodiment, the first gaming session occurs before the second gaming session such that differences in the stimulus signals, stimulations, gaming action results, and performance factors represent changes in player performance over time.

In step 808, the AMS application compares the second performance snapshot to the first performance snapshot. In one embodiment, the AMS application can determine if the second performance snapshot is better, worse, or the same as the first performance snapshot. In one embodiment, the AMS application can make the determination by comparing stimulus signal data, alone, without considering game action results. For example, the AMS can determine from the stimulus signal data of an accessory device that changes have occurred in a player's speed of movements, actions, and/or selection of defined macros or special keys. If the player is able to increase a rate of firing a weapon or perform a special function like calling for air support, then the AMS application can use this information to deduce that the player has improved. In another embodiment, the AMS can evaluate a user's control of an accessory device, such as a mouse, by capturing stimulus signals during a gaming application and comparing these captured stimulus signals to a standard threshold of performance or to a prior time period For example, the AMS can sense steadiness or unsteadiness in movements at an accessory device, such as a mouse. The AMS can detect a "shake" level in user movements of the mouse in the captured stimulus signals. This "shake" level can be compared to a threshold value or to prior captured stimulus signals. If the user demonstrates an level of "shake" that exceeds a threshold or that is larger than a prior level, then the AMS can adjust a configuration setting to compensate. Alternatively, if the "shake" level is in an acceptable range or is decreasing, then the AMS application can determine that a change in a configuration setting is not necessary.

In another embodiment, the AMS application can compare game action results of first and second game sessions or can compare game action results to a one or more threshold levels. The AMS application can determine, based upon gaming action results, whether the player is improving, declining, or staying constant. For example, the gaming results may indicate that the player is achieving a greater number or percentage of opponent hits rather than misses or "kills" rather than mere hits during combat. These observations can be used by AMS to determine that the player is improving. Alternatively, a reduction in hit or kill rates in the gaming action results can indicate that the player is performing more poorly than before. In another embodiment, the AMS application can correlate stimulus signals, stimulations, and gaming results to generate gamer performance factors, such abilities with certain weapon types, missions, and or group performance. In another embodiment, the performance factors can be used to determine if the player's performance is improving, eroding, or staying the same. In another embodiment, the AMS application can analyze the stimulus signals and/or stimulation data during game play for indications of performance. For example, the AMS application can analyze the number of key actions associated with "shooting" that occur during a game round or during a time period and compare these to a threshold of performance to determine if the player is performing better than, worse than, or about the same over time.

If the second performance snapshot is better than or worse than the first performance snapshot in step 808, then the AMS application can update accessory configuration settings in step 812. For example, the AMS can implement a gradual change in accessory configuration setting for any improvement in player performance detected in step 808. The AMS application can use this process to gradually change the configuration settings from default or beginner values to intermediate, advanced, and/or expert values over time as the player improves. In one embodiment, the gradual updating can be determined by an equation, by a set of curves or charts, and/or by a lookup table which can be accessed each time the AMS application determines that the snapshot data indicates an improvement in performance. In one embodiment, the AMS application can gradually update the configuration settings to values associated with lessor accomplishment if the comparison of first and second performance snapshots indicates that the performance of the player has degraded over time.

In another embodiment, in step 816 the AMS application can compare stimulus signals, stimulations, gaming action results, and/or performance factors from a gaming session to one or more thresholds. In steps 820-828, the stimulus signals, stimulations, gaming action results, and/or performance factors, for a gaming session can be compared to one or more thresholds. For example, the stimulus signals and/or stimulation data can be compared to threshold values for speed of actions or movements, stability during aiming and/or usage of special keys. In another example, the gaming action results can be compared to threshold values for resulting actions, such as "kills," misses, and hits. In another embodiment, the performance factors can be compared to threshold values associated with a player's capabilities in specific roles or mission types. For example, the performance factors can indicate an ability to achieve a mission, to carry out the role of sniper, and/or to perform in group play. These performance factors can be given numerical values and then compared to threshold values in step 828. If a player's stimulus signals, stimulations, game action results, and/or performance factors exceeds a threshold standard, then the AMS application can update one or more configuration settings for the accessory in step 812.

In one embodiment, the AMS application can monitor stimulus signals, stimulations, game results, and/or performance factors in real-time and can adjust one or more configuration settings in real time based on the monitored data. For example, during game play, the AMS application can monitor stimulus signals for a mouse accessory device and game results returned from a gaming application. If the gaming application involves some form of shooting at objects or virtual persons, then the AMS application can determine a number of "shots" taken by logging key strokes associated with shooting and a number of "hits" by correlating game results data to the stimulus signals and/or stimulation data. The AMS application can then calculate a real-time shooting accuracy based on a currently-executing game. This shooting accuracy can be compared to a threshold accuracy to determine a player's capability. In one embodiment, if the player is shooting accurately, then the AMS application can adjust a configuration setting to allow the player to achieve even greater results. Alternatively, if the player is inaccurate, then the AMS application can adjust the configuration setting to improve the player's accuracy.

In one embodiment, the configuration setting can be a dots per inch (DPI) setting for a mouse device. The DPI setting controls device resolution. A high DPI setting corresponds to a high resolution. If a mouse is used as an aiming device in a game application, then a high DPI resolution will make the mouse more accurate. Very small mouse movements can be translated into substantial changes in digital data corresponding to mouse position. Thus, it is easier to "aim" a mouse at a virtual computer object or person. However, a high DPI resolution will also cause the mouse to react more slowly to large movement inputs, essentially causing a player to have to move the mouse greater distances to achieve movements on a playing screen. An inaccurate game player (one who misses an object or person that they aim at during game play) will typically benefit from a higher DPI resolution, while an accurate player will typically benefit from a lower DPI. This is because an accurate player will have achieved the fine motor control ability needed for aiming at virtual objects/persons during game play and can take advantage of a lower DPI ("faster") mouse to respond more quickly to game play events. FIGS. 9A-D illustrate embodiments of adaptive configuration settings controllable by the AMS application.

Figure 9A:
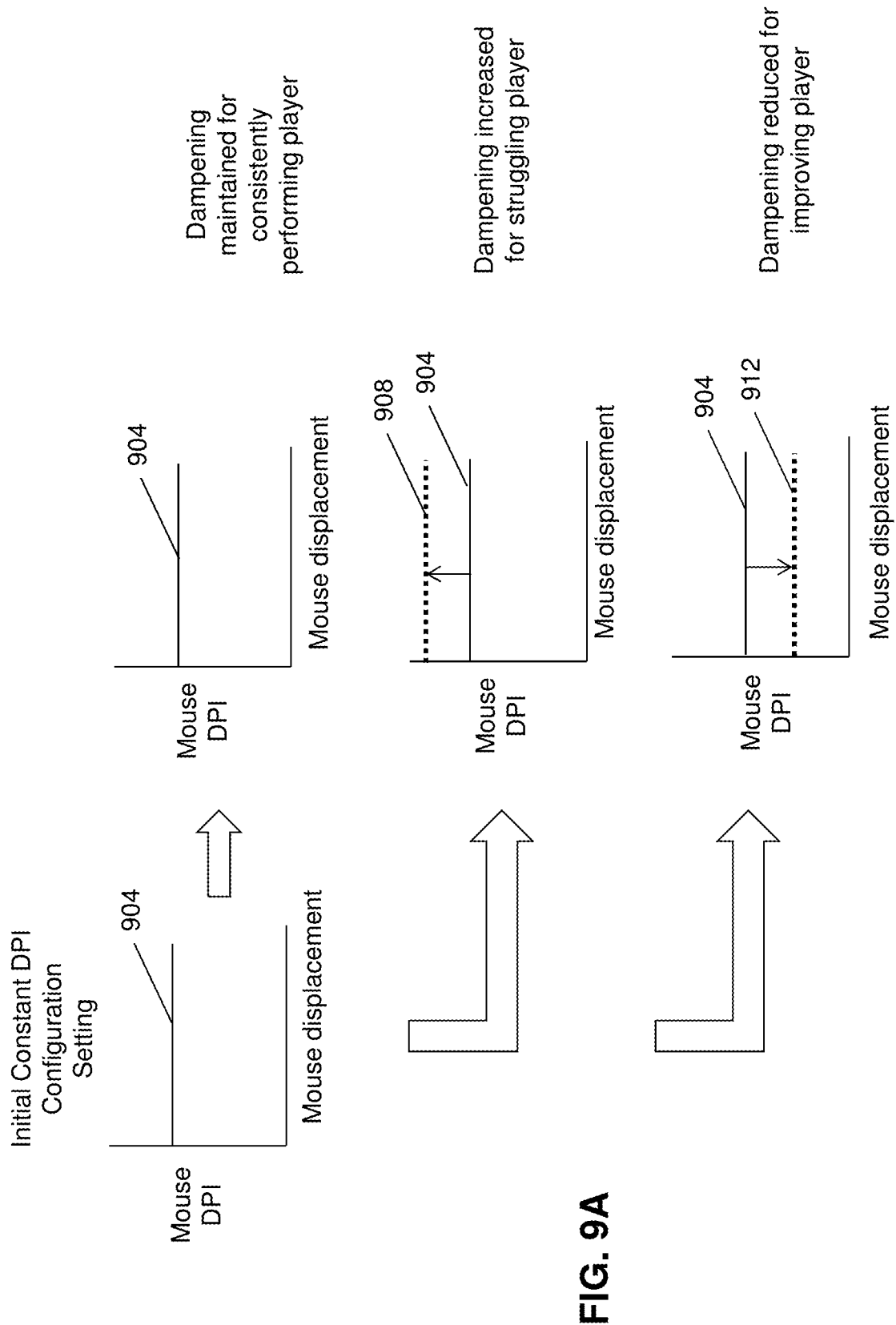

In FIG. 9A, a constant DPI configuration setting is illustrated. In a constant DPI setting, a constant DPI value, such as 100 dots per inch, is used for the translating user movements of the mouse into digital data. The DPI is set to a constant value no matter how small or large the mouse movement, or how small or large the acceleration or velocity of the movement. Therefore, the user of the mouse experiences a set translation of movement of the mouse regardless of whether the movement is a small adjustment of position, such as used in fine aiming, or a large adjustment of position, such as used for traversing a virtual game space or for making large player movements. At startup of the AMS application, or as a default setting, the constant DPI configuration setting 904 can be set to an initial value. The constant DPI provides a constant level of dampening, or filtering, which converts input movements into digital data outputs at a fixed conversion rate. If the AMS application determines from the stimulus signals, stimulations, game results, and/or performance factor data that the player is performing in a consistent and efficient manner (without improvement or degradation in player performance), then the AMS application can maintain the constant DPI at its pre-set value 904. However, if the AMS application detects that the player is struggling with accuracy issues (e.g., frequent misses), then the AMS application can cause the constant DPI 904 to be increased to a higher constant DPI values 908, which dampens the users movements and provides for more accuracy. In one embodiment, the AMS can compare accuracy results for a player, over time, by analyzing prior game session results. In another embodiment, the AMS can perform the analysis in real-time. By increasing the DPI constant value 908, the AMS application can make it easier for a struggling player to aim the mouse at virtual objects and/or persons. In another example, the AMS can reduce dampening of the mouse input by reducing the DPI to a lower constant value 912. By reducing the DPI resolution, the mouse will respond more quickly to player inputs, which will allow the player to cause an avatar to move about a game screen more quickly.

Figure 9B:
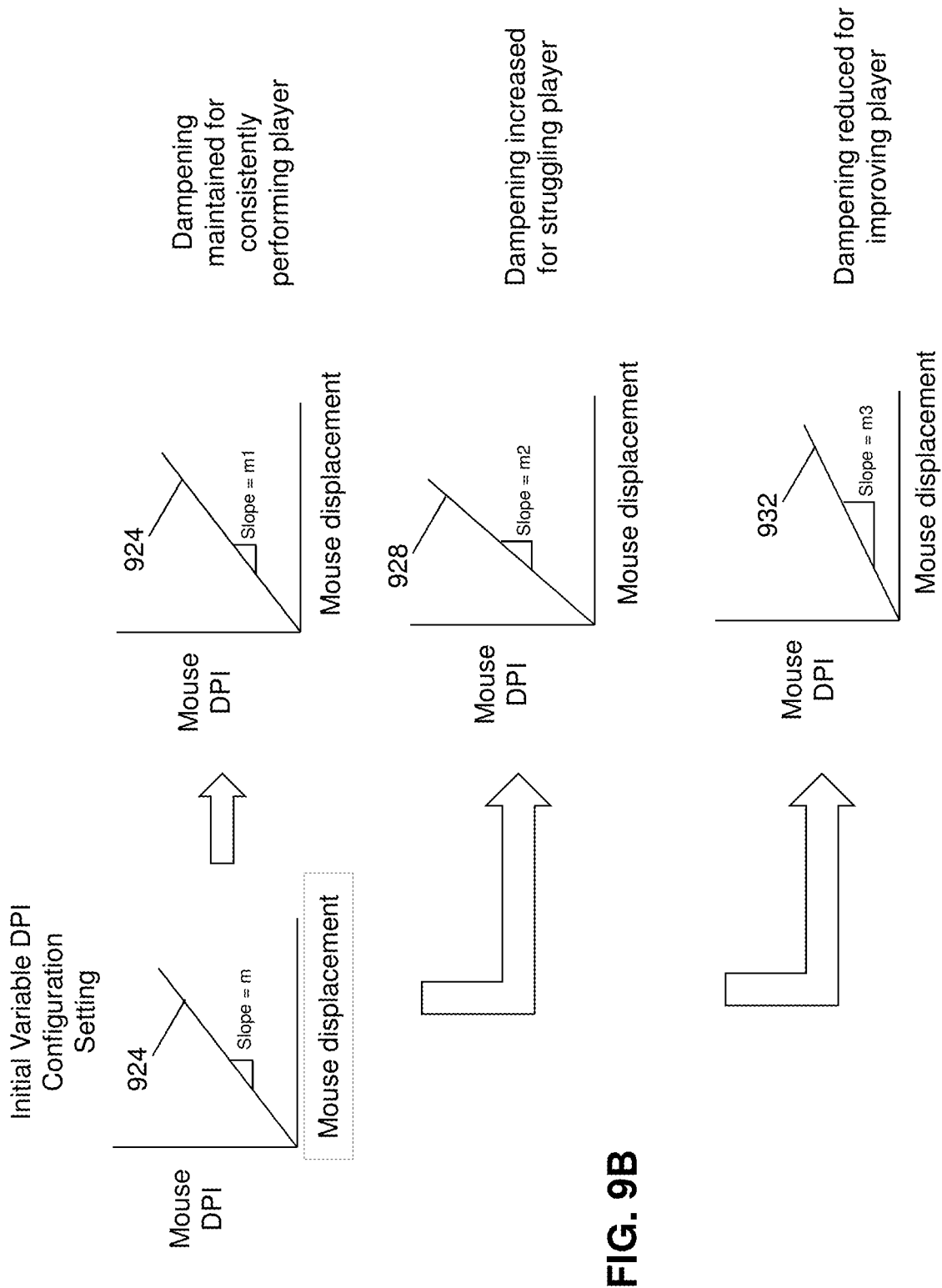

In FIGS. 9B-D, variable DPI configuration settings are illustrated. In one embodiment, shown in FIG. 9B, a variable DPI is implemented with a linear DPI response that allows the AMS application to automatically provide higher resolution for small movements of a mouse device while providing lower resolution for large mouse movements. Alternatively, the curves of FIG. 9B can be changed to have a negative slope. In this embodiment, the AMS application can automatically provide higher resolution for small movements of a mouse device while providing lower resolution for large mouse movements. Some players may want a mouse to respond quickly to large movements while maintaining high accuracy for small movements that are typically associated with aiming or steering or vice-versa depending on the gamer's abilities. In one embodiment, the linear DPI value is implemented as a slope of a line or a linear gain value. Changes in mouse position are multiplied by the DPI gain value 924 in the generation of digital movement data. The linear DPI slope can be increased to a higher DPI slope value 928 for an inaccurate player, while an accurate player can be given a reduced DPI slope value 932.

In one embodiment, shown in FIG. 9C, the variable DPI configuration setting can be implemented as a non-linear response curve 944. The DPI setting can be used by the AMS application to provide a mouse response that is carefully tuned to a player using, for example, a second order (or higher) response curve 944. The AMS can thus provide a variable DPI response that conforms to displacement, speed, and/or acceleration of movement over a spectrum of input situations. In one embodiment, the DPI can be set to an initial non-linear DPI curve 944. The AMS application can use real-time or session-to-session analysis to then adjust the configuration setting to a new DPI response curve 948 to take into account changes in performance. In another embodiment, the response curve 944 can be flipped so that DPI decreases as mouse displacement increases, and vice-versa as shown by the dotted line.

In one embodiment, shown in FIG. 9D, the variable DPI configuration setting can be implements as a step-wise (or discrete), response sphere. Device inputs, which can include both magnitude and direction, can be modeled as input vectors 962. The AMS can use the DPI response sphere 964 to provide DPI values that dampen the response to mouse displacement according to a concentric series of DPI bands each set to a unique value. In one embodiment, each concentric band of the response sphere 962 corresponds to a different DPI value $DPI_1$, $DPI_2$, $DPI_3$. The AMS application can use real-time or session-to-session analysis to update the configuration setting to a new DPI response curve 962 to take into account changes in performance. For example, as a player improves in performance, the inner band ($DPI_1$) can be expanded replacing the middle band ($DPI_2$) as shown in the illustration of FIG. 9D.

The foregoing embodiments provide a method for updating a configuration setting of a gaming accessory according to a performance of a gamer. The performance can be monitored in real-time during a gaming session, after a gaming session (post-game analysis), or both. The performance of the gamer can be determined from a comparison of a current performance versus a prior performance of the gamer when utilizing the gaming accessory according to a given configuration setting. In one embodiment, current and prior performances can be determined from stimulus signals generated by the gaming accessory at a given configuration setting during current and prior gaming sessions without knowledge of how such stimulus signals affect gaming results. In another embodiment, current and prior performances can be determined (without analysis of the stimulus signals) from gaming action results provided by a gaming application responsive to the stimulus signals generated by the gaming accessory according to the given configuration setting during current and prior gaming sessions. In yet another embodiment, current and prior performances can be determined from a combined analysis of stimulus signals generated by the gaming accessory at the given configuration setting and the gaming action results provided by the gaming application responsive to such stimulus signals generated during current and prior gaming sessions.

In one embodiment, a gamer's subsequent performance can be determined by comparing game action results to a first performance threshold for opponent kills resulting from the gamer's use of the gaming accessory at a given configuration setting, a second performance threshold for non-kill hits of the opponent resulting from the gamer's use of the gaming accessory at the given configuration setting, a third performance threshold for misses when firing against the opponent resulting from the gamer's use of the gaming accessory at the given configuration setting, or combinations thereof.

For example, when the gamer's use of the gaming accessory generates gaming action results where kills exceed a first performance threshold of three kills, where the non kills fall below a second performance threshold of four non-kill hits, and where the misses fall below a third performance threshold of three misses, the AMS can be configured to determine that the gamer's performance is better than average. If the prior performance on the other hand was considered average based on these thresholds, then a comparison of current versus prior performance can lead to a determination that the gamer has improved in performance based on the given configuration setting of the gaming accessory. Under these circumstances, the gamer's performance may be further improved by reducing a dampening of the stimulus signals generated by the gaming accessory as shown FIG. 9, thereby increasing the sensitivity of the gaming accessory to the gamer's usage of the accessory. Had the gamer's performance degraded, the AMS application could be adapted to mitigate the performance degradation by increasing dampening of the stimulus signals generated by the gaming accessory as shown FIG. 9, thereby decreasing the sensitivity of the gaming accessory to the gamer's usage of the accessory. Had the gamer's performance not changed, the configuration setting would be maintained.

In one embodiment, the AMS application can also be configured to set a range for a recognized improvement or degradation (much like a hysteresis region) to avoid excessive changes to the configuration setting when improvement or degradation is nominal. In yet another embodiment, the adjustment of the configuration setting can be programmed into a (volatile or non-volatile) memory device of the gaming accessory for local processing by the gaming accessory. Alternatively, the AMS application can process the stimulus signals generated by the gaming accessory when such signals are received.

Adjustments to the configuration setting of a gaming accessory are not limited to sensitivity. Any configurable setting of a gaming accessory can be adjusted based on an analysis by the AMS application of a gamer's on-going performance during a gaming session, after the gaming session, or both. The configuration setting of a gaming accessory can include, for example, configurable settings for counts per inch, frames per second, inches per second, acceleration, three-dimensional motion, lift distance, dots per inch, polling rate, feedback intensity, scroll speed, double-click speed, directional sensitivity, window pointer speed, or a combination thereof. Each of these settings can be adjusted according to embodiments of the subject disclosure.

Figure 10:
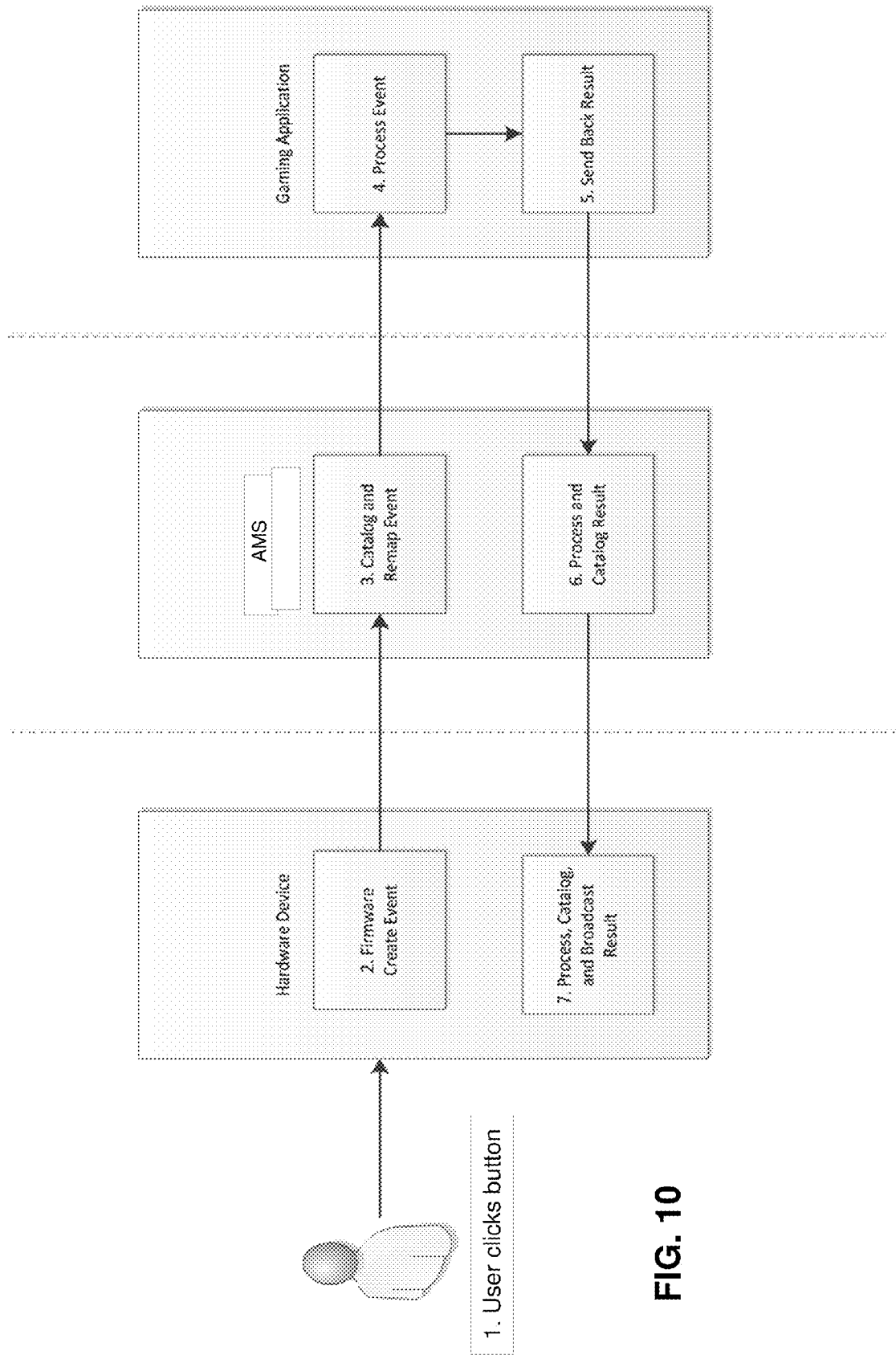
FIGS. 10-11 depicts illustrative embodiments of communication flow diagrams utilized by the AMS application.
Figure 11:
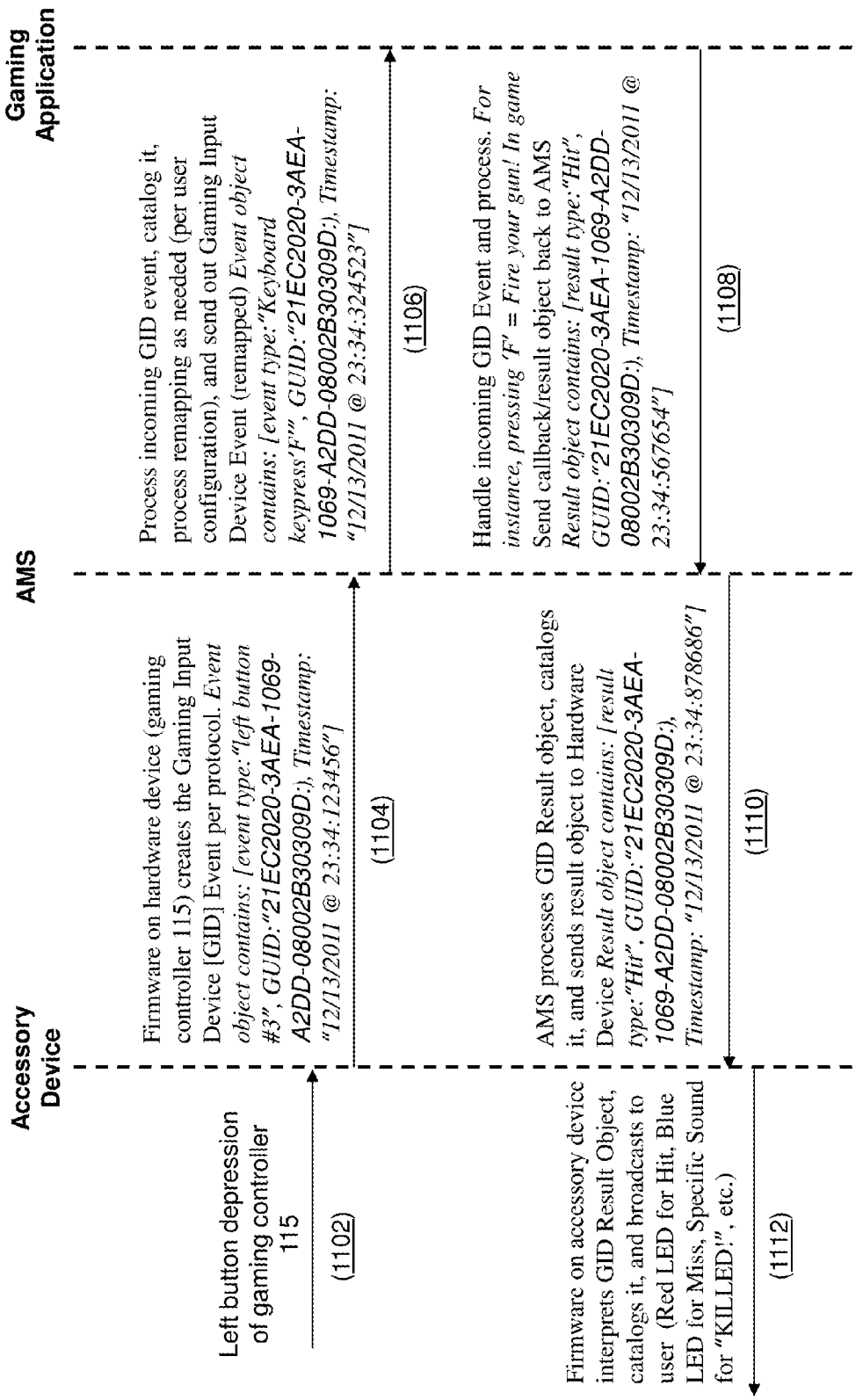

FIGS. 10-11 illustrate embodiments of a system with a corresponding communication flow diagram for correlating stimulus signals, stimulations and gaming action results. In this illustration a user clicks a left button of a gaming controller 115. The gaming controller 115 can include firmware (or circuitry), which creates an event as depicted by event 2 in FIG. 10. The button depression and the event creation are depicted in FIG. 11 as steps 1102 and 1104. In step 1104, the firmware of the gaming controller 115 can, for example, generate an event type "left button #3", and a unique GUID with a time stamp which is submitted to the AMS application. Referring back to FIG. 10, the AMS application catalogues event 3, and, if a substitute stimulation has been predefined, remaps the event according to the substitution. The remapped event is then transmitted to the gaming application at event 4. Event 3 of FIG. 10 is depicted as step 1106 in FIG. 11. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 1108 in FIG. 11. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 1110, the AMS application correlates the stimulus signals generated by the "left button #3 (and/or the substitute stimulation keyboard "F") to the game result "Hit" and catalogues them in memory. The AMS application then submits to the accessory (e.g., gaming controller 115) in step 1110 the game action results "Hit" with the same GUID, and a new time stamp indicating when the result was received. Upon receiving the message from the AMS application, the accessory in step 1112 can process the "Hit" by asserting a red LED on the accessory (e.g., left button illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

In an embodiment where the AMS application receives gaming results from a gaming application via an API as described above, the communication flow diagram shown in FIG. 11 can be modified with a more comprehensive protocol that includes a weapon type being monitored, misses, non-kill hits (i.e., a hit that does not result in a kill), kill hits, and loss of life rate.

The AMS application can present performance factors of each gamer, and the type of weapons being tracked (e.g., sniper rifle, machine gun, hand gun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 12-13.

The methods of FIGS. 5-8 can be adapted to operate in whole or in part in a gaming accessory, in an operating system of a computer, in a gaming console, in a gaming application that generates the video game, in a dongle, or any other suitable software application and/or device. The method of FIGS. 5-8 can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) signal with a macro comprising a combination of substitute stimulatoin, and track the macro when gaming action results are received from the gaming application—rather than track each individual substitute stimulation of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulation of the macro to determine how effective the macro was in performing the kill, and whether further adjustments of the macro might improve the gamer's performance.

In one embodiment, the AMS application can be adapted to present more or less competitive information than is shown in FIGS. 12-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the present disclosure.

FIG. 14 depicts an exemplary diagrammatic representation of a machine in the form of a computer system 1400 within which a set of instructions, when executed, may cause the machine to perform any one or more of the methods discussed above. One or more instances of the machine can operate as any of devices depicted in FIGS. 1-3, and FIG. 15. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A non-transitory machine-readable storage device, comprising executable instructions, which, when executed by a processor, facilitate performance of operations comprising:
receiving a first plurality of stimulus signals generated during game play by a gaming accessory for activating a plurality of weaponry of a gaming application during a first gaming session according to a configuration setting;

replacing the first plurality of stimulus signals with a first plurality of substitute stimulations for execution of the gaming application according to a configuration setting, wherein the first plurality of stimulus signals comprise first game functions and wherein the first plurality of substitute stimulations comprise second game functions;

receiving game action results from the gaming application, wherein the game action results are associated with the execution of the gaming application according to the first plurality of substitute stimulations;

presenting, during game play, a statistical display of the game action results and the activating of the plurality of weaponry of the gaming application contemporaneous with the game play during the first gaming session of the gaming application;

identifying a first performance snapshot of the first gaming session, wherein the first performance snapshot comprises the first plurality of substitute stimulations for the gaming accessory during the first gaming session;

modifying the configuration setting after the first gaming session;

receiving a second plurality of stimulus signals generated by the gaming accessory during a second gaming session according to the configuration setting that is modified;

replacing the second plurality of stimulus signals with a second plurality of substitute stimulations according to the configuration setting that is modified, wherein the second plurality of stimulus signals comprise third game functions and wherein the second plurality of substitute stimulations comprise fourth game functions;

identifying a second performance snapshot of the second gaming session of the gaming application, wherein the second performance snapshot comprises the second plurality of substitute stimulations of the gaming accessory during the second gaming session;

comparing the first performance snapshot to the second performance snapshot to determine a change in performance of a gamer's utilization of the gaming accessory; and adjusting the configuration setting after the second gaming session for the gaming accessory according to the change in the performance of the gamer's utilization of the gaming accessory.

2. The non-transitory machine-readable storage device of claim 1, wherein the configuration setting comprises one of counts per inch, frames per second, inches per second, acceleration, lift distance, dots per inch, polling rate, feedback intensity, scroll speed, double-click speed, directional sensitivity, window pointer speed, or any combination thereof.

3. The non-transitory machine-readable storage device of claim 1, wherein the configuration setting comprises a first constant value during the first gaming session, and during the second gaming session, and wherein the adjusting of the configuration setting comprises adjusting the configuration setting to a second constant value according to the change in the performance of the gamer.

4. The non-transitory machine-readable storage device of claim 1, wherein the configuration setting comprises a first variable value during the first gaming session and during the second gaming session, wherein the adjusting of the configuration setting comprises adjusting the configuration setting to a second variable value according to the change in the performance of the gamer.

5. The non-transitory machine-readable storage device of claim 1, wherein the operations further comprise:

presenting an adjusted configuration setting for user approval;

receiving an acceptance of the adjusted configuration setting; and storing the adjusted configuration setting for processing additional stimulus signals generated by the gaming accessory responsive to receiving the acceptance.

6. The non-transitory machine-readable storage device of claim 1, wherein the gaming accessory comprises one of a mouse, a keyboard, or any combination thereof, wherein the machine-readable storage device and the processor are an integral part of the gaming accessory.

7. The non-transitory machine-readable storage device of claim 1, wherein the configuration setting comprises configuration data that modifies stimulus signals generated by the gaming accessory according to a first configuration profile to produce the first plurality of stimulus signals, wherein the configuration setting that is modified alters the stimulus signals generated by the gaming accessory according to a second configuration profile to generate adjusted stimulus signals, and wherein the adjusted stimulus signals provide for one of mitigating gaming performance due to a degradation in the performance of the gamer's utilization of the gaming accessory, or augmenting the gaming performance due to an improvement in the performance of the gamer's utilization of the gaming accessory.

8. The non-transitory machine-readable storage device of claim 7, wherein the configuration setting that is adjusted provides for one of increasing a dampening of the first plurality of stimulus signals responsive to the degradation in the performance of the gamer's utilization of the gaming accessory, or decreasing the dampening of the first plurality of stimulus signals responsive to the improvement in the performance of the gamer's utilization of the gaming accessory.

9. The non-transitory machine-readable storage device of claim 1, wherein the first performance snapshot further comprises a first plurality of game action results received during the first gaming session, wherein the second performance snapshot further comprises a second plurality of game action results received during the second gaming session, and wherein the determination of the change in the performance of the gamer's utilization of the gaming accessory is further determined from a comparison of the first plurality of game action results and the second plurality of game action results.

10. The non-transitory machine-readable storage device of claim 1, wherein the operations further comprise:

identifying from a user profile a substitute stimulation associated with a first stimulus signal of the gaming accessory;

detecting the first stimulus signal from the first plurality of stimulus signals generated by the gaming accessory; and replacing the first stimulus signal with the substitute stimulation responsive to detecting the first stimulus signal.

11. The non-transitory machine-readable storage device of claim 9, wherein the operations further comprise adding a unique identifier to each of the first plurality of substitute stimulations and the second plurality of substitute stimulations, wherein each of the first plurality of gaming action results and the second plurality of gaming action results comprises the unique identifier.

12. The non-transitory machine-readable storage device of claim 1, wherein the operations further comprise:

correlating the first plurality of substitute stimulations to a first plurality of game action results to generate a first plurality of performance factors associated with the gaming accessory, wherein the first performance snapshot further comprises the first plurality of performance factors; and correlating the second plurality of substitute stimulations to a second plurality of game action results to generate a second plurality of performance factors associated with the gaming accessory, wherein the second performance snapshot further comprises the second plurality of performance factors, wherein the determination of the change in the performance of the gamer's utilization of the gaming accessory is further determined from a comparison of the first plurality of performance factors and the second plurality of performance factors.

13. The non-transitory machine-readable storage device of claim 1, wherein the configuration setting that is adjusted comprises one of a linear configuration setting, a non-linear configuration setting, or a combination thereof.

14. A method, comprising:

replacing, by a system comprising a processor, a first plurality of stimulus signals received from a gaming accessory for activating a plurality of weaponry during game play of a gaming application during a first gaming session with a first plurality of substitute stimulation according to a configuration setting, wherein the first plurality of stimulus signals comprise first game functions and wherein the first plurality of substitute stimulations comprise second game functions;

receiving, by the system, game action results from the gaming application, wherein the game action results are associated with execution of the gaming application according to the first plurality of substitute stimulations;

presenting, by the system during game play, a statistical display of the game action results and the activating of the plurality of weaponry of the gaming application contemporaneous with the game play during the first gaming session of the gaming application;

determining, by the system, a current performance of a gamer during the first gaming session of the gaming application, wherein the performance is determined from the first plurality of substitute stimulations for the gaming accessory during the first gaming session;

identifying, by the system, a prior performance of the gamer during a prior gaming session of the gaming application, wherein the prior performance is determined from a second plurality of substitute stimulations that replace a second plurality of stimulus signals that are generated by the gaming accessory according to the configuration setting;

comparing, by the system, the current performance to the prior performance to determine a change in performance of the gamer; and adjusting, by the system, the configuration setting assigned to the gaming accessory according to the change in the performance of the gamer after the first gaming session.

15. The method of claim 14, wherein the adjusting comprises generating an adjusted configuration setting to provide for one of mitigating gaming performance responsive to a degradation in the current performance of the gamer, or augmenting the gaming performance responsive to an improvement in the current performance of the gamer.

16. The method of claim 15, wherein the adjusted configuration setting provides for one of increasing a dampening of the first plurality of stimulus signals responsive to the degradation in the current performance of the gamer, or decreasing the dampening of the first plurality of stimulus signals responsive to the improvement in the current performance of the gamer.

17. A device, comprising:

a processor; and a memory coupled to the processor, wherein the memory stores executable instructions, which, when executed by the processor, facilitate performance of operations comprising:

identifying a first plurality of stimulus signals that are generated during first game play by a gaming accessory for activating a plurality of in-game objects for a gaming application during a first gaming session according to a configuration setting assigned to the gaming accessory, wherein the first plurality of stimulus signals are replaced with a first plurality of substitute stimulations according to the configuration setting;

identifying a second plurality of stimulus signals generated during second game play by the gaming accessory for activating the plurality of in-game objects during a second gaming session according to the configuration setting assigned to the gaming accessory, wherein the second plurality of stimulus signals are replaced with a second plurality of substitute stimulations according to the configuration setting;

presenting, during game play, a statistical display of game action results and the activating of the plurality of in-game objects of the gaming application contemporaneous with one of the first game play, the second game play, or a combination thereof;

comparing the first plurality of stimulus signals to the second plurality of stimulus signals to determine a change in performance of a gamer's utilization of the gaming accessory; and adjusting the configuration setting assigned to the gaming accessory according to the change in the performance of the gamer's utilization of the gaming accessory after the second gaming session.

18. The device of claim 17, wherein the comparing the first plurality of stimulus signals to the second plurality of stimulus signals comprises:

correlating the first plurality of stimulations to a first plurality of game action results to generate a first performance factor associated with the gaming accessory;

correlating the second plurality of stimulations to a second plurality of game action results to generate a second performance factor associated with the gaming accessory;

comparing the first performance factor and the second performance factor; and wherein the adjusting of the configuration setting comprises adjusting the configuration setting according to the comparing of the first performance factor and the second performance factor.

19. The device of claim 18, wherein the first performance factor comprises one of opponent kills, non-kill hits of the opponent, misses when firing against the opponent, or any combinations thereof determined from the first plurality of game action results.

20. The device of claim 18, wherein the first performance factor comprises one of opponent kills, non-kill hits of the opponent, misses when firing against the opponent, or any combinations thereof determined from the first plurality of game action results.

21. The device of claim 17, wherein the configuration setting comprises one of counts per inch, frames per second, inches per second, acceleration, lift distance, dots per inch, polling rate, feedback intensity, scroll speed, double-click speed, directional sensitivity, window pointer speed, or any combination thereof.

22. The device of claim 17, wherein the operations further comprise:
   identifying from a user profile associated with the device the first plurality of substitute stimulations associated with the first plurality of stimulus signals that are associated with the gaming accessory.

23. The device of claim 17, wherein the operations further comprise adding a unique identifier to each of the first plurality of stimulation signals, wherein each of a first plurality of game action results received from a gaming application comprise the unique identifier.

24. The device of claim 17, wherein the operations further comprise:
   presenting an adjusted configuration setting for user approval;
   receiving an acceptance of the adjusted configuration setting; and
   storing the adjusted configuration setting for processing additional stimulus signals generated by the gaming accessory responsive to receiving the acceptance.

25. The device of claim 17, wherein the gaming accessory comprises one of a mouse, a keyboard, or any combination thereof.

* * * * *